(12) United States Patent
Coppola et al.

(10) Patent No.: US 10,125,809 B2
(45) Date of Patent: Nov. 13, 2018

(54) CRANKSHAFT ASSEMBLIES AND METHODS OF MANUFACTURING THE SAME

(71) Applicant: GM Global Technology Operations LLC, Detroit, MI (US)

(72) Inventors: Anthony M. Coppola, Royal Oak, MI (US); Hamid G. Kia, Bloomfield Hills, MI (US); Paul M. Najt, Bloomfield Hills, MI (US); Russell P. Durrett, Bloomfield Hills, MI (US); Michael A. Potter, Grass Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/225,080

(22) Filed: Aug. 1, 2016

(65) Prior Publication Data
US 2018/0031027 A1    Feb. 1, 2018

(51) Int. Cl.
| F16C 3/06 | (2006.01) |
| B21K 1/08 | (2006.01) |
| F16C 3/08 | (2006.01) |
| F16C 3/20 | (2006.01) |

(52) U.S. Cl.
CPC .................. *F16C 3/08* (2013.01); *B21K 1/08* (2013.01); *F16C 3/20* (2013.01)

(58) Field of Classification Search
CPC ...... F16C 3/04; F16C 3/06; F16C 3/08; F16C 3/10; F16C 3/12; F16C 3/20; F16C 9/02; B21K 1/08; F02F 7/0085
See application file for complete search history.

(56) References Cited

U.S. PATENT DOCUMENTS

| 1,534,411 | A | * | 4/1925 | Potter ..................... F16C 3/20 |
| | | | | 123/58.1 |
| 3,481,316 | A | | 12/1969 | Olson et al. |
| 4,446,827 | A | | 5/1984 | Kubozuka |
| 4,659,268 | A | | 4/1987 | Del Mundo et al. |
| 4,726,334 | A | | 2/1988 | Holtzberg et al. |
| 4,848,292 | A | | 7/1989 | Holtzberg |

(Continued)

FOREIGN PATENT DOCUMENTS

| CN | 107672189 A | 2/2018 |
| CN | 107672196 A | 2/2018 |

(Continued)

OTHER PUBLICATIONS

Machine translation of DE 3011358 A1 obtained on Nov. 27, 2017. (Year: 2017).*

(Continued)

*Primary Examiner* — Adam D Rogers
(74) *Attorney, Agent, or Firm* — Harness, Dickey & Pierce, P.L.C.

(57) ABSTRACT

Crankshaft assemblies for vehicle assemblies, such as engine assemblies, and methods of manufacturing crankshaft assemblies are provided. The crankshaft assembly includes a first crankpin disposed between a first pair of webs and at least a first main bearing journal connected to the first pair of webs, wherein at least one of the first crankpin, the first pair of webs or the first main bearing journal is a polymeric composite including a polymer and a plurality of reinforcing fibers.

12 Claims, 9 Drawing Sheets

(56) References Cited

U.S. PATENT DOCUMENTS

| | | | | |
|---|---|---|---|---|
| 4,901,692 A * | 2/1990 | Madden | ............... | F02B 75/20 |
| | | | | 123/192.2 |
| 4,930,470 A | 6/1990 | Kabat et al. | | |
| 5,062,393 A | 11/1991 | Smith et al. | | |
| 5,083,537 A | 1/1992 | Onofrio et al. | | |
| 5,176,456 A * | 1/1993 | Takebayashi | ........... | F16C 33/62 |
| | | | | 384/492 |
| 5,207,120 A * | 5/1993 | Arnold | ...................... | F16C 3/10 |
| | | | | 29/888.08 |
| 5,259,677 A * | 11/1993 | Degrange | ................. | F16C 3/20 |
| | | | | 29/898.07 |
| 5,301,423 A | 4/1994 | Clark et al. | | |
| 5,370,087 A | 12/1994 | Guimond et al. | | |
| 5,435,059 A * | 7/1995 | Chawla | ..................... | F16C 3/20 |
| | | | | 29/888.08 |
| 5,922,472 A | 7/1999 | Keener | | |
| 5,947,667 A | 9/1999 | Cassatt et al. | | |
| 6,223,702 B1 | 5/2001 | Achenbach et al. | | |
| 6,412,366 B1 * | 7/2002 | Leith | ........................ | F16C 3/20 |
| | | | | 464/180 |
| 6,684,844 B1 | 2/2004 | Wang et al. | | |
| 6,959,683 B2 * | 11/2005 | Gokan | .................... | F16F 15/26 |
| | | | | 123/192.1 |
| 7,191,770 B1 | 3/2007 | Anderson et al. | | |
| 7,367,303 B2 * | 5/2008 | Yamamoto | ................ | F16C 3/08 |
| | | | | 123/192.1 |
| 7,819,462 B1 | 10/2010 | Owens | | |
| 8,033,592 B2 | 10/2011 | Hsu et al. | | |
| 8,109,492 B2 | 2/2012 | Winocur | | |
| 8,757,028 B2 * | 6/2014 | Broughton | ............... | F01M 1/06 |
| | | | | 123/196 R |
| 8,961,724 B2 | 2/2015 | Polewarczyk et al. | | |
| 9,227,673 B2 | 1/2016 | Berger et al. | | |
| 9,302,733 B2 * | 4/2016 | Schlanger | ............... | B62M 3/003 |
| 9,416,749 B2 | 8/2016 | Maki et al. | | |
| 2002/0104505 A1 * | 8/2002 | Ericson | ................... | F02B 33/04 |
| | | | | 123/197.2 |
| 2004/0226393 A1 * | 11/2004 | Hong | ........................ | F16C 3/20 |
| | | | | 74/68 |
| 2006/0102110 A1 | 5/2006 | Takenaka et al. | | |
| 2007/0277645 A1 * | 12/2007 | Weisskopf | ......... | B22D 19/0072 |
| | | | | 74/579 E |
| 2009/0126180 A1 | 5/2009 | Keener | | |
| 2009/0223479 A1 * | 9/2009 | Schoell | .................... | F16C 9/04 |
| | | | | 123/197.4 |
| 2011/0300333 A1 | 12/2011 | Kallinen | | |
| 2012/0085313 A1 | 4/2012 | Reisser | | |
| 2013/0065042 A1 | 3/2013 | Esser-Kahn et al. | | |
| 2013/0189888 A1 | 7/2013 | Patrick et al. | | |
| 2014/0072386 A1 | 3/2014 | Baugh, Sr. | | |
| 2016/0084295 A1 * | 3/2016 | Murrish | .................. | B22C 9/103 |
| | | | | 74/603 |
| 2016/0264082 A1 | 9/2016 | Berger et al. | | |
| 2018/0029316 A1 * | 2/2018 | Coppola | ................. | B29C 70/70 |
| 2018/0030922 A1 * | 2/2018 | Kia | ........................... | F02F 1/16 |
| 2018/0030923 A1 * | 2/2018 | Coppola | ................. | F02F 1/004 |
| 2018/0030924 A1 * | 2/2018 | Coppola | ................. | B29C 65/48 |
| 2018/0031027 A1 | 2/2018 | Coppola et al. | | |

FOREIGN PATENT DOCUMENTS

| | | | | |
|---|---|---|---|---|
| CN | 107676188 A | | 2/2018 | |
| CN | 107676189 A | | 2/2018 | |
| CN | 107676370 A | | 2/2018 | |
| DE | 3011358 A1 * | 10/1981 | ........... | B29C 53/083 |
| DE | 3013135 A1 * | 10/1981 | ........... | B21B 21/005 |
| DE | 19818589 A1 | 11/1999 | | |
| DE | 102012018330 A1 * | 8/2013 | ............... | F16C 9/02 |
| DE | 102013015431 A1 * | 3/2015 | ............... | F16C 3/08 |
| DE | 102014224827 A1 | 6/2015 | | |
| DE | 102017213313 A1 | 2/2018 | | |
| DE | 102017213315 A1 | 2/2018 | | |
| DE | 102017213316 A1 | 2/2018 | | |
| DE | 102017213317 A1 | 2/2018 | | |
| DE | 102017213319 A1 | 2/2018 | | |
| EP | 0345424 A1 * | 12/1989 | ............... | F16C 3/20 |
| EP | 0361367 A2 | 4/1990 | | |
| FR | 1593248 A | 5/1970 | | |
| WO | WO-2012117876 A1 * | 9/2012 | ............... | F16C 9/02 |
| WO | WO-2014153065 A1 | 9/2014 | | |

OTHER PUBLICATIONS

Machine translation of DE 102012018330 A1 obtained on Apr. 17, 2018. (Year: 2018).*

Guimond et al.; "Composite V-6 Diesel Engine Concept;" SAE Technical Paper 920084; Feb. 1992; 8 pages.

Esser-Kahn et al.; "Three-Dimensional Microvascular Fiber-Reinforced Composites;" Advanced Materials; vol. 23; 2011; pp. 3654-3658.

Brosius et al.; "Phenolics for High Temperature Applications in Small Engine Technologies (Cost Effective Performance Advantages);" SAE Technical Paper 951809; 1995; pp. 405-414.

Buckley et al.; "A Prediction of Weight Reduction and Performance Improvements Attainable through the use of Fiber Reinforced Composites in I.C. Engines;" SAE Technical Paper 2005-01-3693; Oct. 2005; 17 pages.

"Dow Introduces Bonding Process;" Materials Today; http://www.materialstoday.com/carbon-fiber/news/dow-introduces-bonding-process; May 10, 2016; 1 page.

First Office Action in German Patent Application No. 102017213316.3 from the German Patent Office dated Apr. 4, 2018 and correspondence from Manitz, Finsterwald & Partner summarizing contents; 6 pages.

Second Office Action in German Patent Application No. 102017213316.3 from the German Patent Office dated Jun. 7, 2018 and correspondence from Manitz, Finsterwald & Partner summarizing contents; 6 pages.

* cited by examiner

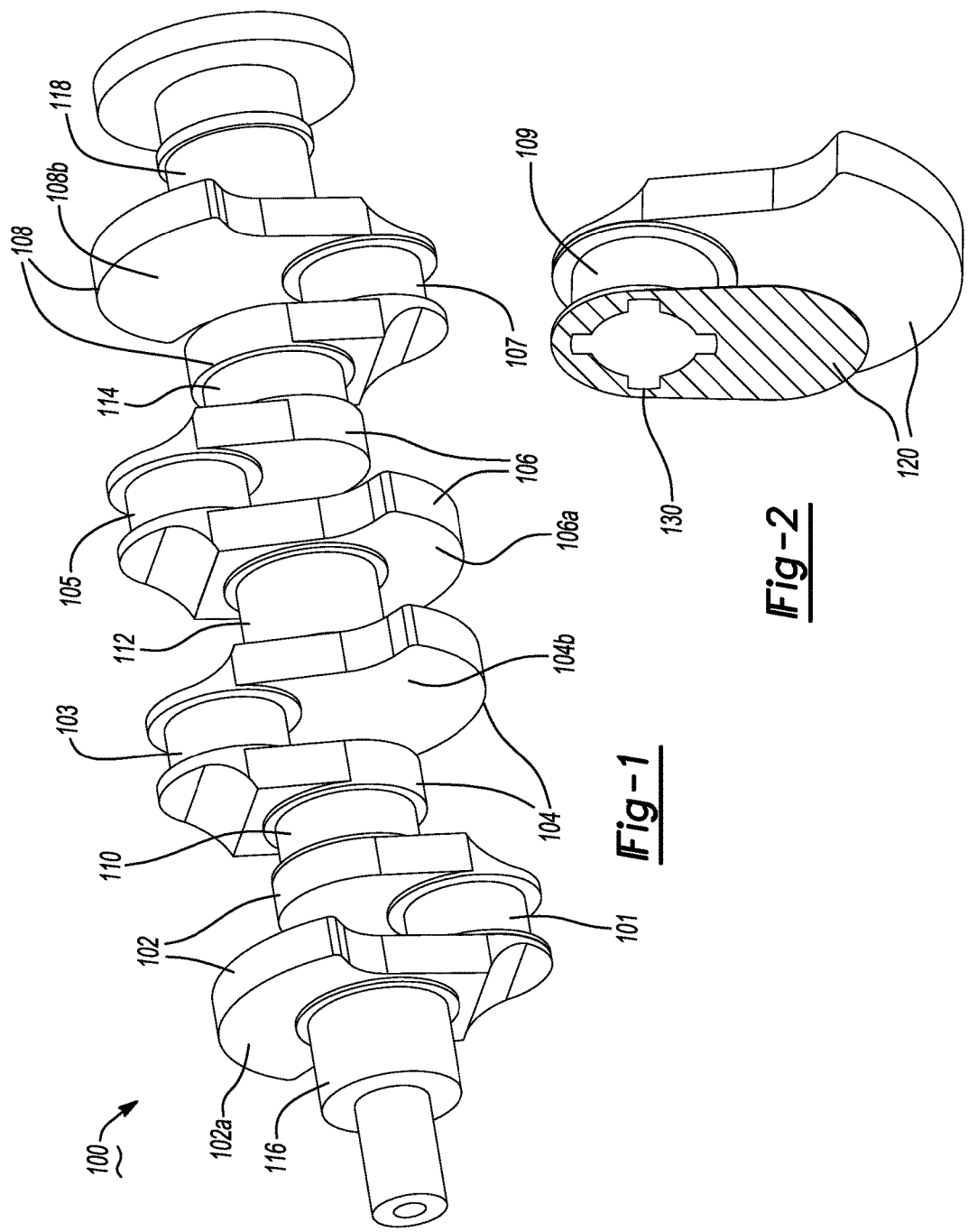

CRANKSHAFT ASSEMBLIES AND METHODS OF MANUFACTURING THE SAME

FIELD

The present disclosure relates to crankshaft assemblies for vehicles including incorporation of a polymeric composite material in the crankshaft assemblies and methods of manufacturing the crankshaft assemblies.

BACKGROUND

This section provides background information related to the present disclosure which is not necessarily prior art.

Traditionally, engine components for automotive applications have been made of metals, such as steel and iron. Metals components are robust, typically having good ductility, durability, strength and impact resistance. While metals have performed as acceptable engine components, they have a distinct disadvantage in being heavy and reducing gravimetric efficiency, performance and power of a vehicle thereby reducing fuel economy of the vehicle.

Weight reduction for increased fuel economy in vehicles has spurred the use of various lightweight metal components, such as aluminum and magnesium alloys as well as use of light-weight reinforced composite materials. While use of such lightweight materials can serve to reduce overall weight and generally may improve fuel efficiency, issues can arise when using such materials in an engine assembly due to high operating temperatures associated with the engine assembly. For example, the lightweight metal components can also have relatively high linear coefficients of thermal expansion, as compared to traditional steel or ceramic materials. In engine assemblies, the use of such lightweight metals can cause uneven thermal expansion under certain thermal operating conditions relative to adjacent components having lower linear coefficients of thermal expansion, like steel or ceramic materials, resulting in separation of components and decreased performance. Additionally, lightweight reinforced composite materials may have strength limitations, such as diminished tensile strength, and they can degrade after continuous exposure to high temperatures. Thus, lightweight engine assemblies having increased durability under high temperature operating conditions are needed to further improve efficiency of operation and fuel economy. In particular, lightweight reciprocating components, such as crankshaft assemblies, are needed because reciprocating components can significantly affect economy and performance because of their effect on rotational momentum of inertia.

SUMMARY

This section provides a general summary of the disclosure, and is not a comprehensive disclosure of its full scope or all of its features.

In certain aspects, the present disclosure provides a crankshaft assembly for a vehicle. The crankshaft assembly may comprise a first crankpin disposed between a first pair of webs and at least a first main bearing journal connected to the first pair of webs, wherein at least one of the first crankpin, the first pair of webs, or the first main bearing journal comprises a polymeric composite comprising a polymer and a plurality of reinforcing fibers.

In other aspects, the present disclosure provides a crankshaft assembly for a vehicle. The crankshaft assembly may comprise a plurality of crankpins each disposed between a plurality of corresponding pairs of webs, a plurality of main bearing journals respectively disposed between adjacent pairs of webs, and a front main bearing journal on a first terminal end of the crankshaft assembly and a rear main bearing journal on a second terminal end of the crankshaft assembly. At least one of the crankpins, the pairs of webs, or the main bearing journals may comprise a polymeric composite comprising a polymer comprising a thermoset resin or a thermoplastic resin and a plurality of reinforcing fibers selected from the group consisting of: carbon fibers, glass fibers, aramid fibers, polymeric fibers, metallic fibers and a combination thereof.

In other aspects, the present disclosure provides a method of manufacturing a crankshaft assembly for a vehicle. The method may comprise arranging at least a first component comprising metal or ceramic in a mold; arranging a first crankpin precursor comprising a first plurality of reinforcing fibers or a first crankpin defined void space for receiving the first crankpin precursor adjacent to the first component in the mold; arranging a first pair of web precursors comprising a second plurality of reinforcing fibers or a first pair of webs defined void space for receiving the first pair of webs precursor adjacent to the first component in the mold, introducing a resin into the mold, and solidifying the resin to produce a first polymeric composite crankpin disposed between a first polymeric composite pair of webs and adjacent to the at least one metal component to form the crankshaft assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a perspective view of a crankshaft assembly according to certain aspects of the present disclosure.

FIG. 2 shows a detailed view of a crankpin and corresponding pair of webs according to certain aspects of the present disclosure.

Corresponding reference numerals indicate corresponding parts throughout the several views of the drawings.

DETAILED DESCRIPTION

Figure 3:
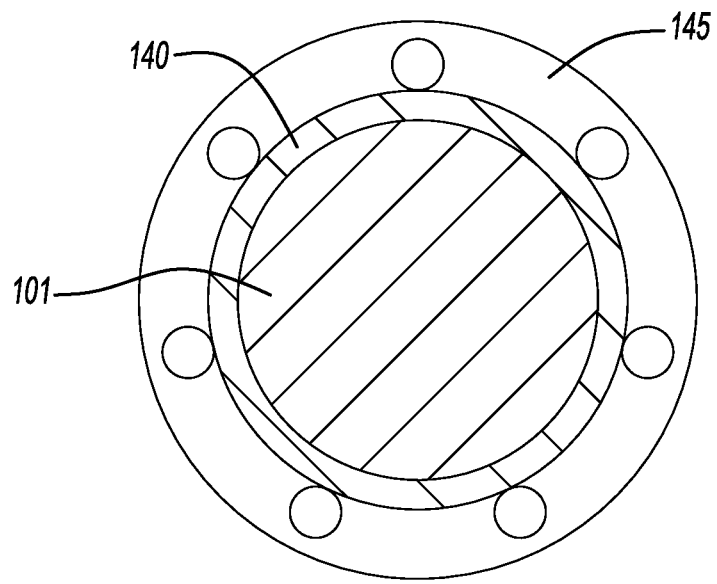
FIG. 3 shows a cross-sectional view of an alternative crankpin and corresponding pair of webs according to certain aspects of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "attached to" or "coupled to" another element or layer, it may be directly on, engaged, connected, attached or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," and the like). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In a vehicle, such as an automobile, an engine is a power source that produces torque for propulsion. The engine is an assembly of parts, including cylinder liners, pistons, crankshafts, combustion chambers, and the like. In a four stroke internal combustion engine each piston has an intake stroke, a compression stroke, a power stroke, and an exhaust stroke. During the intake stroke, a piston moves downward and an inlet valve is opened to permit a gaseous air mixture to fill a combustion chamber. During the compression stroke, intake and exhaust valves are closed and the piston moves upward to compress the gaseous air mixture. During the power stroke, the gaseous air mixture in the combustion chamber is ignited by a spark plug and the rapidly expanding combustion gases drive the piston downward. During the exhaust stroke, the exhaust valve is opened and the piston moves upward to discharge the combustion gases (exhaust gases). Overall, during internal combustion, the engine components may be subjected to varying amounts of stresses as well as varying temperatures due to the exothermic combustion reactions occurring in the engine block.

As discussed above, as weight of engine components increases, power, fuel economy, and efficiency may decrease. Thus, it is desirable to include various lightweight components, such as lightweight metals and lightweight composite materials, in engine assemblies instead of the traditional steel and/or iron components to decrease weight of the engine but also to maintain structural integrity of the engine.

Thus, crankshaft assemblies for use in vehicle assemblies are provided herein which include a combination of components formed of lightweight materials (e.g., polymeric composite materials) and traditional materials. Advantageously, such vehicle assemblies also may result in an improvement in noise, vibration and harshness. While the crankshaft assemblies described herein are particularly suitable for use in components of an automobile, they may also be used in a variety of other vehicles. Non-limiting examples of vehicles that can be manufactured by the current technology include automobiles, tractors, buses, motorcycles, boats, mobile homes, campers, aircrafts (manned and unmanned), and tanks.

In particular, crankshaft assemblies including a polymeric composite material are provided herein. For example, as best shown in FIG. 1, a crankshaft assembly 100 is provided. Crankshaft assembly 100 includes a first crankpin 101 disposed between a first pair of webs 102. The crankshaft assembly may further include a second crankpin 103 disposed between a second pair of webs 104, a third crankpin 105 disposed between a third pair of webs 106, and/or a fourth crankpin 107 disposed between a fourth pair of webs 108. Each of the pair of webs may be suitably connected via a respective main bearing journal for transmitting torque between the pairs of webs and respective main bearing journals. For example, the crankshaft assembly 100 may include a first main bearing journal 110 disposed between the first pair of webs 102 and second pair of webs 104, a second main bearing journal 112 disposed between a second pair of webs 104 and a third pair of webs 106 and/or a third main bearing journal 114 disposed between a third pair of webs 106 and a fourth pair of webs 108. Thus, the first crankpin 101 and first pair of webs 102 are connected to the second crankpin 103 and the second pair of webs 104 via the first main bearing journal 110. The second crankpin 103 and second pair of webs 104 are connected to the third crankpin 105 and the third pair of webs 106 via the second main bearing journal 112. The third crankpin 105 and third pair of webs 106 are connected to the fourth crankpin 107 and the fourth pair of webs 108 via the third main bearing journal 114. Additionally or alternatively, a front main bearing journal 116 may be present on a first terminal end of the crankshaft assembly 100, e.g., coupled to a first a pair of webs 102. A rear main bearing journal 118 may be present on a second terminal end of the crankshaft assembly 100, e.g., coupled to a fourth a pair of webs 108.

Figure 4:
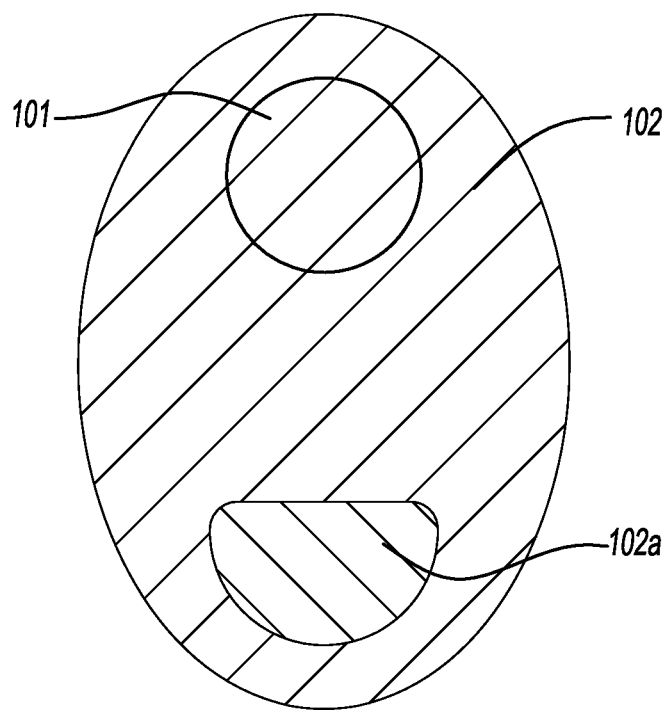
FIG. 4 shows a cross-sectional view of an alternative crankpin and corresponding web and counterweight according to certain aspects of the present disclosure.

Additionally or alternatively, at least one of the webs may further comprise a counterweight for balancing the crankshaft assembly (e.g., to offset weight of the pistons and/or connecting rod). For example, at least one web of the first pair of webs 102 may include a counterweight 102a. As shown in FIG. 1, only one of the webs in the first pair of webs 102 includes the counterweight 102a. Alternatively, both webs of the first pair of webs 102 may include counterweights (not shown). The counterweight described herein may be integrally formed with the corresponding web, such that web and the counterweight form an integral component (i.e., the web and counterweigh form one continuous component). Alternatively, the counterweight and corresponding web may be separate components which are joined together, e.g., by compressive forces, by a suitable adhesive, or by suitable fasteners. For example, FIG. 4 shows a separate counterweight 102a present in one of the first pair of webs 102. In either instance, the counterweight and the web may be formed of the same material or different material. Additionally, the counterweight may be any suitable shape (e.g., round, oval, rectangular etc.)

Additionally or alternatively, at least one web of the second pair of webs 104 may include a counterweight 104b. Alternatively, both webs of the second pair of webs 104 may include counterweights (not shown). Additionally or alternatively, at least one web of the third pair of webs 106 may include a counterweight 106a. Alternatively, both webs of the third pair of webs 106 may include counterweights (not shown). Additionally or alternatively, at least one web of the fourth pair of webs 108 may include a counterweight 108b. Alternatively, both webs of the fourth pair of webs 108 may include counterweights (not shown).

As will be appreciated by those of ordinary skill in the art, the crankshaft assembly 100 shown in FIG. 1 depicts four crankpins 101, 103, 105, 108, four corresponding pairs of webs 102, 104, 106, 108 and three main bearing journals 110, 112, 114 and associated componentry (e.g., corresponding connecting rods, pistons, etc.) but may in fact include fewer than four crankpins (e.g., 1 crankpin, 2 crankpins, 3 crankpins), fewer than four pairs of webs (e.g., 1 pair of webs, 2 pair of webs, 3 pair of webs), fewer than three main bearing journals (2 main bearing journals, 1 main bearing journal), and combinations thereof. Additionally or alternatively, the crankshaft assembly 100 may in fact include more than four crankpins (e.g., 5 crankpins, 6 crankpins, 7 crankpins, 8 crankpins), more than four pairs of webs (e.g., 5 pairs of webs, 6 pairs of webs, 7 pairs of webs, 8 pairs of webs), more than three main bearing journals (e.g., 4 main bearing journals, 5 main bearing journals, 6 main bearing journals, 7 main bearing journals), and combinations thereof. For example, the present disclosure contemplates a plurality of crankpins as described herein each disposed between a plurality of corresponding pairs of webs as described herein; a plurality of main bearing journals as described herein respectively disposed between adjacent pairs of webs; and a front main bearing journal as described herein on a first terminal end of the crankshaft assembly and a rear main bearing journal on a second terminal end of the crankshaft assembly. At least one of the crankpins, the pairs of webs, or the main bearing journals comprises a polymeric composite as described herein. The plurality of pairs of webs may further comprise a plurality of respective counterweights as described herein.

In certain variations, it is further contemplated that the webs described herein may include one or more mechanical interlock features for coupling together the crankpins with the corresponding pairs of webs. For example, complementary protruding flanges, grooves, channels, locking wings of differing shapes could be used as mechanical interlock features. For exemplary purposes, as shown in FIG. 2 with respect a crankpin 109, at least a portion of at least one of the webs of a pair of webs 120 may comprise one or more mechanical interlock features 130 for coupling with the second crankpin 103. Complementary mechanical interlocking features may be present on the crankpin 109 for interlocking with the mechanical interlock features 130. Additionally or alternatively, at least a portion of both of the webs of the pair of webs 120 may comprise one or more mechanical interlock features 130 for coupling with the crankpin 109. Such mechanical interlock features may be present on any pair of webs, corresponding crankpins, corresponding bearing journals and combinations thereof.

Additionally or alternatively, the crankshaft assembly of claim 1 further comprising a connecting rod (not shown) coupled to the first crankpin 101. Further, it is contemplated herein that each of the crankpins 101, 103, 105 and 107 may be coupled to a corresponding connecting rod as well as a corresponding piston.

Additionally or alternatively, a sleeve 140 may be disposed around at least one of the crankpins (e.g., crankpin 101), as shown in FIG. 3. The sleeve 140 may be any suitable material that has sufficient hardness, which can either be lubricated or has a low coefficient of friction. For example, the sleeve 140 may comprise a metal (e.g. steel, iron, magnesium alloy, aluminum alloy, metal composite), a ceramic (e.g., alumina, silicon carbide, ceramic composite) or a polymeric composite as described herein. A suitable bearing, e.g., a roller bearing 145, may be disposed around the metal sleeve 140. The bearing may be a metal material (e.g., steel, iron, magnesium alloy, aluminum alloy, metal composite). An outer rotating component (not shown), such as a crank housing or connecting rod, may be disposed around the roller bearing 145. Such outer components may be metal (e.g. steel, iron, magnesium alloy, aluminum alloy, metal composite), ceramic (e.g., alumina, silicon carbide, ceramic composite) or a polymeric composite as described herein Advantageously, the crankshaft assembly described herein can comprise a combination of metal materials (e.g. steel, iron, magnesium alloy, aluminum alloy, metal composite), ceramic materials (e.g., alumina, silicon carbide, ceramic composite) and polymeric composite materials in order to reduce the weight of the crankshaft assembly and overall vehicle assembly. The main bearing journals 110, 112, 114, 116, 118 can comprise a metal material (e.g. steel, iron, magnesium alloy, aluminum alloy, metal composite), a ceramic material (e.g., alumina, silicon carbide, ceramic composite), or a polymeric composite material as described herein. In particular, at least one of crankpins 101, 103, 105, 107, at least one of pair of webs 102, 104, 106, 108, or at least one of main bearing journals 110, 112, 114, 116, 118 comprises a polymeric composite. For example, the first crankpin 101 can comprise the polymeric composite, the first pair of webs 102 and/or the first main bearing journal 110 comprises the polymeric composite. Additionally or alternatively, the counterweights 102a, 104b, 106a, 108b may comprise a metal material (e.g. steel, iron, magnesium alloy, aluminum alloy, metal composite), ceramic material (e.g., alumina, silicon carbide, ceramic composite) or polymeric composite. For example, as shown in the FIG. 4, the at least one of the webs in the first pair of webs 102 and the crankpin 101 may comprise polymeric composite and the counterweight 102a may comprise a metal (e.g. steel, iron, magnesium alloy, aluminum alloy, metal composite). Other combinations of materials not shown are also contemplated herein, e.g., the web 102 may comprise polymeric composite, the crankpin 101 may comprise a metal (e.g. steel, iron, magnesium alloy, aluminum alloy, metal composite) and the counterweight 102a may comprise a metal (e.g. steel, iron, magnesium alloy, aluminum alloy, metal composite) or the web 102 may comprise a metal (e.g. steel, iron, magnesium alloy, aluminum alloy, metal composite), the crankpin 101 may comprise polymeric composite and the counterweight 102a may comprise a metal (e.g. steel, iron, magnesium alloy, aluminum alloy, metal composite), etc.

The polymeric composite described above comprises a polymer and a plurality of reinforcing fibers. Examples of suitable polymers include, but are not limited to a thermoset resin, a thermoplastic resin, elastomer and combination thereof. Preferable polymers include, but are not limited to epoxies, phenolics, vinylesters, bismaleimides, polyether ether ketone (PEEK), polyamides, polyimides and polyamideimides. Examples of suitable reinforcing fibers include, but are not limited to carbon fibers, glass fibers, aramid fibers, polyethylene fibers, organic fibers, metallic fibers, and combinations thereof. In particular, the reinforcing fibers are glass fibers and/or carbon fibers. The reinforcing fibers may be continuous fibers or discontinuous fibers. In particular, the reinforcing fibers are continuous fibers.

Figure 5A:
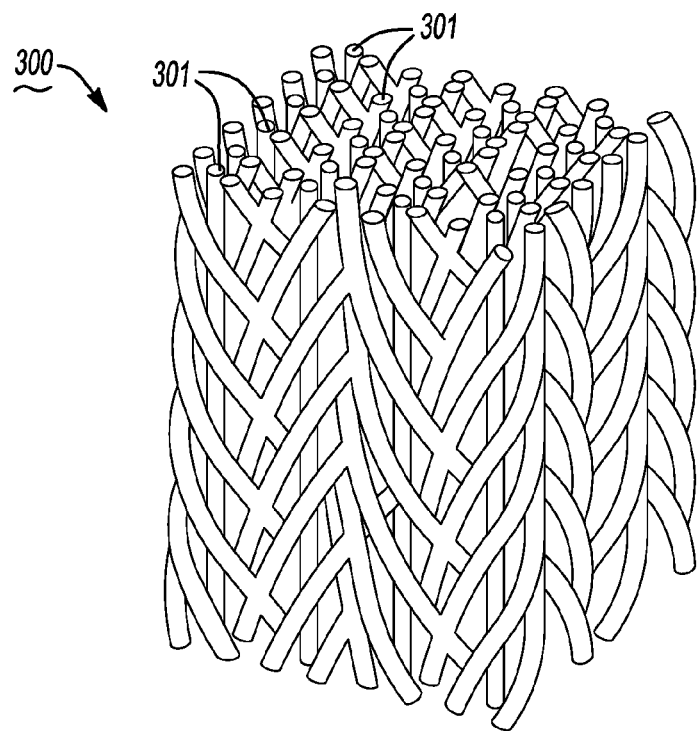
FIGS. 5a and 5b shows a detailed view of polymeric composite crankpins formed of woven reinforcing fibers.
Figure 5B:
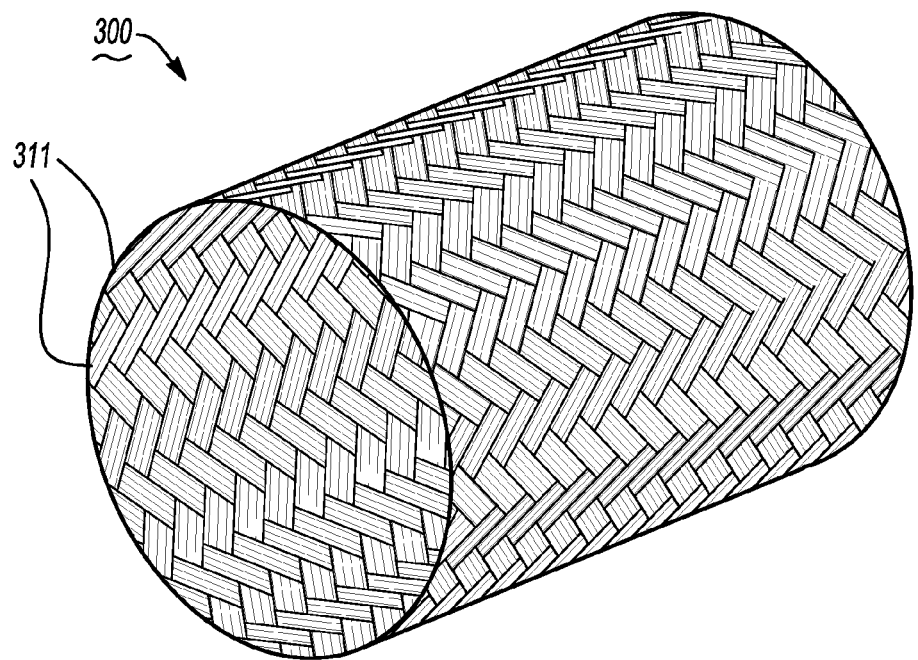

Polymeric composites can be formed by using strips of the composite precursor material, such as a fiber-based material (e.g., cloth or graphite tape). The composite may be formed with one or more layers, where each layer can be formed from contacting and/or overlapping strips of the fiber-based material. In particular, the a polymeric composite crankpin may comprise one or more layers, where each layer can be formed from contacting and/or overlapping reinforcing fibers to form an interwoven preform of reinforcing fibers. The reinforcing fibers may be formed into a shape of a rod or a tube to form the polymeric composite pin. For example, a detailed view of a polymeric composite crankpin 300 is shown in FIG. 5a where reinforcing fibers 301 (e.g., carbon fibers, glass fibers, combinations thereof) are woven or braided to form the polymeric composite crankpin 300. Alternatively, a polymeric composite crankpin 310 can comprise braided reinforcing fibers 311 (e.g., carbon fibers, glass fibers, combinations thereof) in the shape of a tube or rod with a hollow interior, as shown FIG. 5b. It should be noted that other weaving patterns are also contemplated and not limited to the patterns shown in FIGS. 5a-5a, which are merely example embodiments.

The fiber-based substrate material (e.g., reinforcing fibers) may also comprise a resin (e.g., a polymer). The resin can be solidified (e.g., cured or reacted) and thus can serve to bond single or multiple layers together in the polymeric composite. Various methods are typically employed for introducing resin to impregnated fiber-based substrate composite material systems: wet winding (or layup), pre-impregnating (referred to as "pre-preg"), and resin transfer molding. For wet winding, a dry fiber reinforcement material can be wetted with the resin as it is used, usually by submersion through a bath. For pre-impregnating (pre-preg), the resin is wetted into the fiber-based material in advance, and usually includes a step of partially curing the resin to have a viscous or tacky consistency (also known as a B-stage partial cure), and then winding up the pre-preg fiber-based material for later use. Pre-preg composite material systems tend to use thermoset resin systems, which can be cured by elevated temperatures with cure times ranging from about 1 minute to about 2 hours (depending on the cure temperatures). However, some pre-preg materials may employ resins that cure with actinic radiation (e.g., ultraviolet radiation (UV)). For resin transfer molding, dry fiber reinforcement material may be placed into a mold and resin may be infused into the mold under pressure (e.g., about 10 psi to about 2000 psi). Injection molding techniques known in the art may also be used to introduce resin into the reinforcement material, particularly where the reinforcement material comprise discontinuous fibers. For example, a precursor comprising a resin and the reinforcement material may be injected or infused into a defined space or mold followed by solidification of the precursor to form the polymeric composite material. The term "injection molding" also includes reaction injection molding using at thermoset resin.

In certain other aspects, the present teachings also contemplate an attaching step where a reinforcement material is applied, for example, via filament winding, braiding or weaving near, within, and/or over a work surface. For example, to form the webs described herein reinforcing fibers may be wound around a crankshaft pin and, optionally a counterweight, to form the desired shape of the web, followed by infusion or resin and curing to form the polymeric composite web. The method may optionally comprise applying or introducing an uncured resin composition into or onto the fiber-based reinforcement material. By applying, it is meant that the uncured or unreacted resin composition is wetted out onto the fiber-based material and thus may be coated on a surface of the fiber-based material or imbibed/impregnated into the reinforcement fiber-based material (for example, into the pores or openings within the reinforcement fiber-based material). After the resin is introduced to the regions having the reinforcement material, followed by solidifying (e.g., curing or reacting) to form the polymeric composite. Pre-preg fiber-based material may be applied via filament winding, braiding or weaving as well.

In certain variations, to form the webs described herein, reinforcing fibers may be wound around a crankshaft pin and a counterweight, if present, to form the desired shape of the web, followed by infusion or resin and solidifying (e.g., curing or reacting) to form the polymeric composite web. Alternatively, the webs described herein may be formed from polymeric composite plates or discs, where the webs can be cut out of the polymeric composite plates or discs in the appropriate shape with suitable apertures for receiving the crankpin, the counterweight and/or any other further pins or fasteners.

In other particular embodiments, methods of manufacturing the crankshaft assemblies described herein are provided. The method may comprise arranging at least a first component in a mold. The first component may be metal or ceramic. The first component may be selected from the group consisting of a connecting rod, a bearing (e.g, journal bearing, roller bearing), a sleeve, oil or coolant channels or galleries, fasteners, and a combination thereof. In particular, at least one metal component is arranged in the mold, such as a bearing The method may further comprise arranging a first crankpin precursor comprising a first plurality of reinforcing fibers as described herein (e.g., carbon fibers, glass fibers, aramid fibers, polymeric fibers, metallic fibers and a combination thereof) or a first crankpin defined void space for receiving the first crankpin precursor adjacent to the first component. The first crankpin defined void space may be defined by a metal or polymer boundary present in the mold, which delineates the shape of the first crankpin. The method may further comprise arranging a first pair of web precursor comprising a second plurality of reinforcing fibers herein (e.g., carbon fibers, glass fibers, aramid fibers, polymeric fibers, metallic fibers and a combination thereof) or a first pair of webs define void space for receiving the first pair of webs precursor adjacent to the first component in the mold. The first pair of webs defined void space may be defined by a metal or polymer boundary present in the mold, which delineates the shape of the first pair of webs.

The method further comprises introducing a resin into the mold and solidifying (e.g., curing or reacting) the resin to produce a first polymeric composite crankpin disposed between a first polymeric composite pair of webs and adjacent to the first component to form the crankshaft assembly. The resin may be a suitable polymer, such as but not limited to a thermoset resin, a thermoplastic resin, elastomer and a combination thereof. Preferable polymers include, but are not limited to epoxies, phenolics, vinylesters, bismaleimides, polyether ether ketone (PEEK), polyamides, polyimides and polyamideimides.

In certain variations, arranging the first crankpin defined void space may further comprise introducing the first crankpin precursor and the resin, separately or together, into the first crankpin defined void space, e.g., by injection molding. Additionally, arranging the first pair of webs defined void space may further comprises introducing the first pair of webs precursor and the resin, separately or together, into the first pair of webs defined void space e.g., by injection molding.

The method may further comprise solidifying (e.g., curing or reacting) the resin to produce a first polymeric composite crankpin disposed between a first polymeric composite pair of webs and adjacent to the first component to form the crankshaft assembly.

Additionally or alternatively, the method may further comprise arranging a main bearing journal precursor comprising a third plurality of reinforcing fibers as described herein (e.g., carbon fibers, glass fibers, aramid fibers, polymeric fibers, metallic fibers and a combination thereof) or a first main bearing journal defined void space for receiving the first main bearing journal precursor adjacent to the first component. The first main bearing journal defined void space may be defined by a metal or polymer boundary present in the mold, which delineates the shape of the first main bearing journal. The first plurality of reinforcing fibers, the second plurality of reinforcing fibers and the third plurality of reinforcing fibers may be the same or different. Arranging the first main bearing journal void space may further comprise introducing the first main bearing journal precursor and the resin, separately or together, into the first crankpin void space, e.g., by injection molding. Thus, the resin may be solidified (e.g., cured or reacted) the resin to produce a first polymeric composite crankpin disposed between a first polymeric composite pair of webs and a first main bearing journal connected to the first pair of webs, which are adjacent to the first component to form the crankshaft assembly.

Additionally or alternatively, the method may comprise any combination of the steps recited above. For example, the first crankpin precursor, the first crankpin defined void space, the first pair of webs precursor, the first pair of webs defined void space, the first main bearing journal precursor and/or the first main bearing journal defined void space may be arranged in the mold adjacent one another without the first component.

Additionally or alternatively, the method may further comprise further fastening of the components by any suitable means, e.g., fasteners, adhesive, etc.

As will be appreciated by one skilled in the art, the methods described herein contemplate arranging a plurality of metal component in the mold, arranging a plurality of crankpin precursors and plurality of pair of web precursors, introducing a resin as described herein into the mold, and curing or reacting the resin to produce a plurality of polymeric composite crankpins disposed between a plurality of corresponding pairs of webs and adjacent to a plurality of corresponding metal components (e.g., main bearing journals) to form a crankshaft assembly.

Additionally or alternatively, the at least one metal component may be a crankpin and/or a pair of webs. Thus, if one of the metal components is a crankpin, the method may comprising arranging a pair of web precursors comprising a plurality of reinforcing fibers herein (e.g., carbon fibers, glass fibers, aramid fibers, polymeric fibers, metallic fibers and a combination thereof) adjacent to the at least one metal component (e.g., crankpin) in the mold followed by introducing a resin as described herein in the mold and curing or reacting the resin to form the crankshaft assembly. Similarly, if one of the metal components is a pair of webs, the method may comprising arranging a crankpin precursors comprising a plurality of reinforcing fibers herein (e.g., carbon fibers, glass fibers, aramid fibers, polymeric fibers, metallic fibers and a combination thereof) adjacent to the at least one metal component (e.g., pair of webs) in the mold followed by introducing a resin as described herein in the mold and curing or reacting the resin to form the crankshaft assembly.

In other certain variations, a crankshaft assembly may be manufactured by forming each component separately (e.g., each web, each crankpin, each main bearing journal, etc.) and then joining together the components to form the crankshaft assembly.

Figure 6:
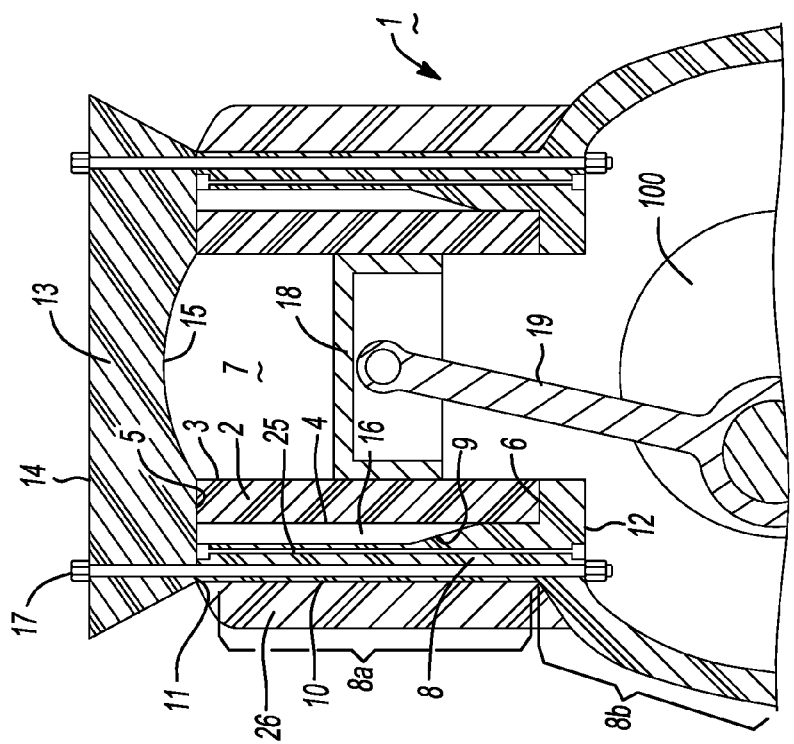
FIG. 6 shows a cross-sectional view of a vehicle assembly according to certain aspects of the present disclosure.

In other certain variations, the present disclosure contemplates vehicle assemblies (e.g., engine assemblies) including the crankshaft assemblies described herein. For example, as best shown in FIG. 6, an engine assembly 1 (e.g., for use in a vehicle) is provided. The engine assembly 1 includes a liner 2, which defines an open void cylindrical region 7. The liner 2 may be any suitable material, such as but not limited to metal (e.g. steel, iron, magnesium alloy, aluminum alloy, metal composite) or ceramic (e.g., alumina, silicon carbide, ceramic composite). In certain variations, the liner 2 is a metal material. The liner 2 generally may be cylindrically shaped and have hollow interior. The liner 2 has an interior surface 3, an opposing exterior surface 4, a first terminal surface 5 and an opposing second terminal surface 6. The engine assembly 1 also includes a housing 8 disposed around at least a portion of the exterior surface 4 of the liner 2. The housing 8 may also be adjacent to the second terminal surface 6 of the liner 2. The housing 8 has an interior surface 9, an opposing exterior surface 10, a third terminal surface 11, and an opposing fourth terminal surface 12. The housing 8 may be a lightweight metal (e.g., aluminum alloy, magnesium alloy), a ceramic material (e.g., alumina, silicon carbide) or a polymeric composite material. A layer of polymeric composite (e.g., comprising discontinuous fibers) (not shown) may also be present between the exterior surface 4 of the liner 2 and the interior surface 9 of the housing 8.

The engine assembly 1 may further include a cylinder head 13 having a fifth terminal surface 14 and an opposing sixth terminal surface 15. At least a portion of the sixth terminal surface 15 may be adjacent to the first terminal surface 5 of the liner 2. The cylinder head 13 may be any suitable material, such as metal (e.g. steel, iron, magnesium alloy, aluminum alloy, metal composite), ceramic (e.g., alumina, silicon carbide, ceramic composite) or a polymeric composite material as described herein. In certain variations, the cylinder head 13 is a metal material. The liner 2 may be held in place by its contact with the cylinder head 13 and housing 8. A coolant channel 16 may be defined between at least a portion of the exterior surface 4 of the liner 2, an interior surface 9 of the housing 8 and the sixth terminal surface 15 of the cylinder head 13. If more than one liner is present, there may be a continuous coolant channel 16 adjacent to each liner or there may be discrete coolant channels corresponding to each liner. The coolant channel 16 is capable of receiving a suitable heat transfer fluid for cooling a vehicle assembly (e.g., engine assembly). Examples of suitable heat transfer fluids include, but are not limited to air, water, oil, ethylene glycol, propylene glycol, glycerol, methanol, and combinations thereof. The air may be supplied from an air conditioning system or produced from movement of the vehicle. In particular, the heat transfer fluid is a mixture of water and ethylene glycol. The heat transfer fluid may be supplied by at least one pump (not shown) from at least one supply reservoir or supply channel (not shown) to at least one inlet (not shown) in the coolant channel 16. The pump and supply reservoir may be present adjacent to the engine assembly. The heat transfer fluid may be circulated through the coolant channel 16 at a temperature of about 70° C. to about 140° C., about 80° C. to about 130° C., or about 90° C. to about 120° C. The pump and supply reservoir may be present adjacent to the engine assembly. Optionally, the heat transfer fluid may flow through a cooler (not shown) to further reduce the temperature of the heat transfer fluid or the heat transfer fluid may flow through a heater (not shown) to increase the temperature of the heat transfer fluid. One of ordinary skill in the art appreciates that the heat transfer fluid may be supplied to one or more coolant channels as necessary.

The cylinder head 13, housing 8 and/or liner 2 may be coupled together by any suitable fasteners. For example, a plurality of fasteners 17 (e.g. bolts) may join together the cylinder head 13 and the housing 8. The plurality of fasteners 17 may comprise any suitable material, such as, but not limited to, metal, polymeric composites and combinations thereof. Additionally or alternatively, a suitable sealant (not shown) and/or gasket (not shown) may be present between at least a portion of the sixth terminal surface 15 of the cylinder head 13, at least a portion of the first terminal surface 5 of the liner 2, and/or a least a portion of the third terminal surface 11 of the housing 8.

Figure 7:
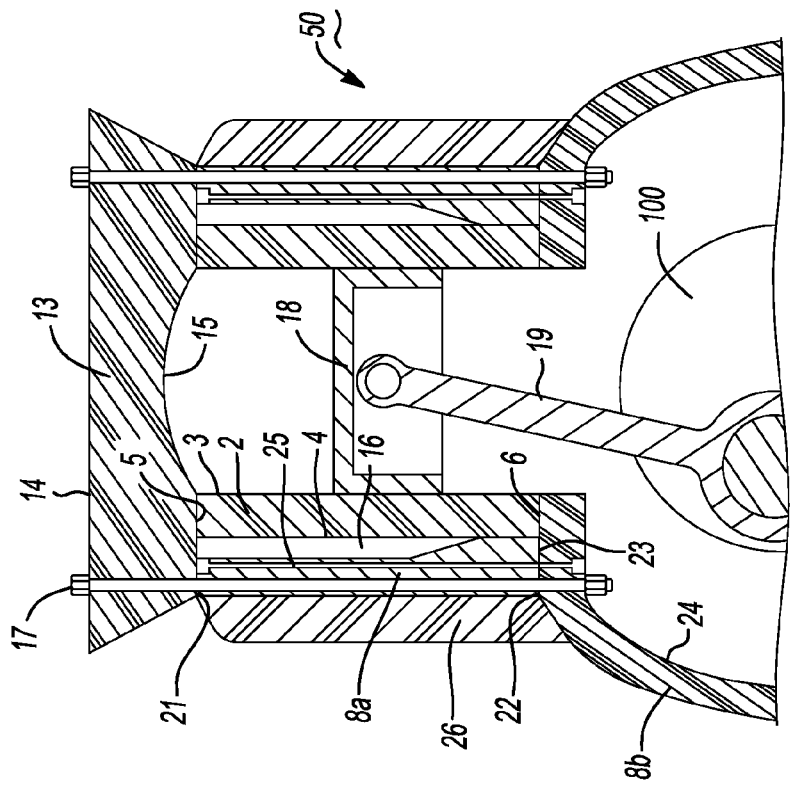
FIG. 7 shows an alternative cross-sectional view of a vehicle assembly according to certain aspects of the present disclosure.

The cylindrical region 7 defined by the liner 2 may receive a piston 18. The piston 18 is connected to the crankshaft assembly 100 as described herein via a connecting rod 19. The piston 18 and connecting rod 19 may be any suitable material, e.g., metal, ceramic, polymeric composite, and combinations thereof. As will be appreciated by those of skill in the art, the engine assembly 1 shown in FIG. 7 depicts a single piston 18 and single cylindrical region 7 and associated componentry, but may in fact include a plurality of pistons, cylindrical regions 7, plurality of polymeric composite pins 39 and associated components described above.

In various embodiments, the housing 8 comprises a cylinder housing portion 8a and crank housing portion 8b. The cylinder housing portion 8a and the crank housing portion 8b may be integrally formed, as shown in FIG. 6. Alternatively, as shown in FIG. 7, the cylinder housing portion 8a and the crank housing portion 8b may be distinct components joined together via an adhesive (not shown) or with a plurality of fasteners 17 in engine assembly 50. When present as distinct components, the cylinder housing portion 8a and the crank housing portion 8b may be the same or different material. With reference to FIG. 8, the cylinder housing portion 8a has a seventh terminal surface 21 and an opposing eighth terminal surface 22. The crank housing portion 8b has a ninth terminal surface 23 and an opposing tenth terminal surface 24. The ninth terminal surface 23 of the crank housing portion is adjacent to the second terminal surface 6 of the liner 2 and the eighth terminal surface 22 of the cylinder housing portion 8a. The seventh terminal surface 21 of the cylinder housing portion 8a may be adjacent to the sixth terminal surface 15 of the cylinder head 13. The cylinder head 13, cylinder housing portion 8a, the crank housing portion 8b, and/or liner 2 may be coupled together by any suitable fasteners as described herein. For example, a plurality of fasteners 17 (e.g. bolts) may join together the cylinder head 13, the cylinder housing portion 8a, and the crank housing portion 8b. The plurality of fasteners 17 may comprise any suitable material, such as, but not limited to, metal, polymeric composites and combinations thereof. Additionally or alternatively, a suitable sealant (not shown) and/or gasket (not shown) may be present between at least a portion of the sixth terminal surface 15 of the cylinder head 13, at least a portion of the first terminal surface 5 of the liner 2, and/or a least a portion of the seventh terminal surface 21 of the cylinder housing portion 8a.

In certain aspects, the housing 8 is a polymeric composite material as described herein. In such instances, the housing 8 may comprise a suitable polymer and plurality of suitable reinforcing fibers. Examples of suitable polymers include, but are not limited to a thermoset resin, a thermoplastic resin, elastomer, and combination thereof. Preferable polymers include, but are not limited to epoxies, phenolics, vinylesters, bismaleimides, polyether ether ketone (PEEK), polyamides, polyimides and polyamideimides. Examples of suitable reinforcing fibers include, but are not limited to carbon fibers, glass fibers, aramid fibers, polyethylene fibers, ceramic fibers, organic fibers, metallic fibers, and combinations thereof. In particular, the reinforcing fibers are glass fibers and/or carbon fibers. The reinforcing fibers may be discontinuous fibers or continuous fibers. In particular, the reinforcing fibers are continuous fibers.

In order to heat and/or cool the engine assembly 1, the housing 8 (e.g., polymeric composite) can further include a plurality of microchannels 25, as shown in FIG. 6, for receiving a heat transfer fluid as described herein. The heat transfer fluid may be supplied by at least one pump (not shown) from at least one supply reservoir or supply channel (not shown) to at least one inlet (not shown) in the microchannels 25 in the vehicle assembly. The pump and supply reservoir may be present adjacent to the engine assembly. The heat transfer fluid may be at supplied at a suitable temperature to cool and/or heat the vehicle assembly, e.g., about 10° C. to about 120° C., about 20° C. to about 100° C. or about 20° C. to about 90° C. Optionally, the heat transfer fluid may flow through a cooler (not shown) to further reduce the temperature of the heat transfer fluid or the heat transfer fluid may flow through a heater (not shown) to increase the temperature of the heat transfer fluid.

The microchannels 25 may have a substantially round cross-section. As understood herein, "substantially round" may include circular and oval cross-sections and the dimensions of the cross-section may deviate in some aspects. The microchannels 25 may have a diameter of less than about 8,000 µm. Additionally or alternatively, the microchannels 25 have a diameter of about 0.1 µm to about 8,000 µm, 0.1 µm to about 5,000 µm, 0.1 µm to about 1,000 µm, about 1 µm to about 500 µm or about 1 µm to about 200 µm. Additionally or alternatively, the microchannels 25 may have a substantially rectangular cross-section. As understood herein, "substantially rectangular" may include square cross-sections and the dimensions of the cross-section may deviate in some aspects. Preferably, at least a portion of the microchannels 25 are interconnected, which may prevent blockages. The microchannels 25 may be oriented in any suitable direction, for example, axially, radially, spiral, branched, intersecting, criss-crossing and combinations thereof.

Figure 8A:
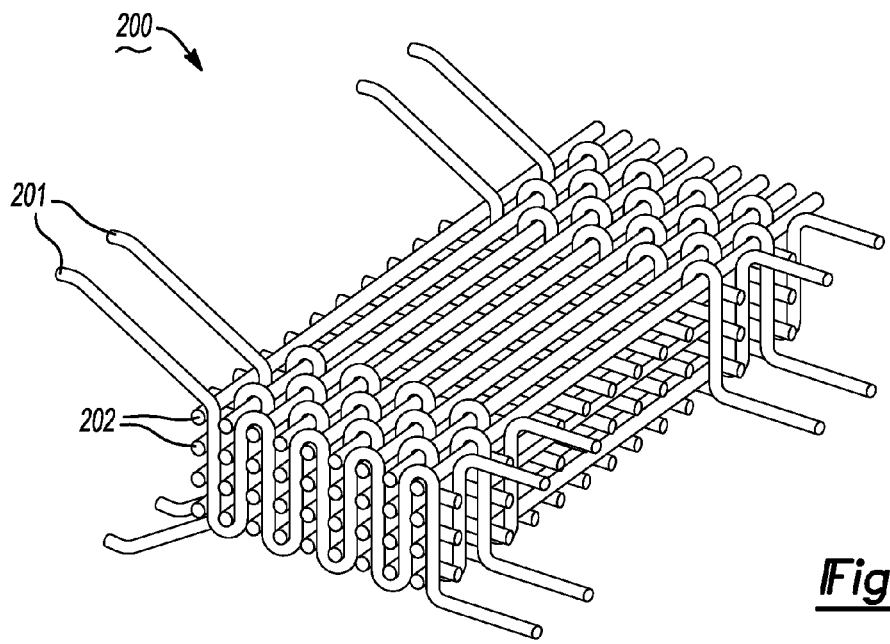
FIGS. 8a-8e show schematics illustrating formation of microchannels in a polymeric composite according to certain aspects of the present disclosure.
Figure 8B:
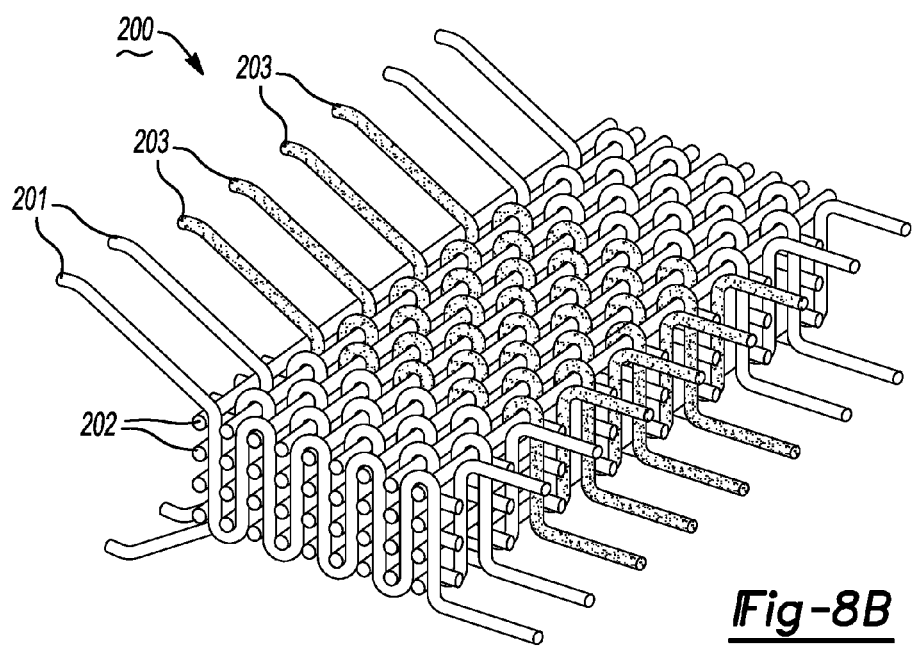

In certain other aspects, the present teaching also contemplates a process of using sacrificial fibers to form the microchannels 25 in the polymeric composite (e.g., housing 8). As shown in FIG. 8a, a composite woven preform 200 comprises interwoven first reinforcing fibers 201 (e.g., carbon fibers, glass fibers) and second reinforcing fibers 202 (e.g., carbon fibers, glass fibers) to form a three dimensional woven structure. The first reinforcing fibers 201 and the second reinforcing fibers 202 can be the same or different fibers. Sacrificial fibers 203 can be woven into the composite woven preform 200 along with the first reinforcing fibers 201, as shown in FIG. 8b. The first reinforcing fibers 201 and the sacrificial fibers 203 can be directed through the second reinforcing fibers 202 sinusoidally. It should be noted that other weaving patterns are also contemplated and not limited to the patterns shown in FIGS. 8a-8e, which are merely example embodiments. The sacrificial fibers 203 comprises a material, which can withstand weaving with the first reinforcing fibers 201 and/or the second reinforcing fibers 202 as well as solidification of the polymeric composite (e.g., resin infusion and curing), but is capable of vaporizing, melting or dissolving under conditions which do not substantially vaporize, melt or dissolve other components of the polymeric composite (e.g., reinforcing fibers). Examples of suitable sacrificial fiber materials include, but are not limited to metals and polymers. Non-limiting metals may include solders, which comprise lead, tin, zinc, aluminum, suitable alloys and the like. Non-limiting polymers may include polyvinyl acetate, polylactic acid, polyethylene, polystyrene. Additionally or alternatively, the sacrificial fibers may further be treated with a catalyst or chemically modified to alter melting or degradation behavior.

Figure 8C:
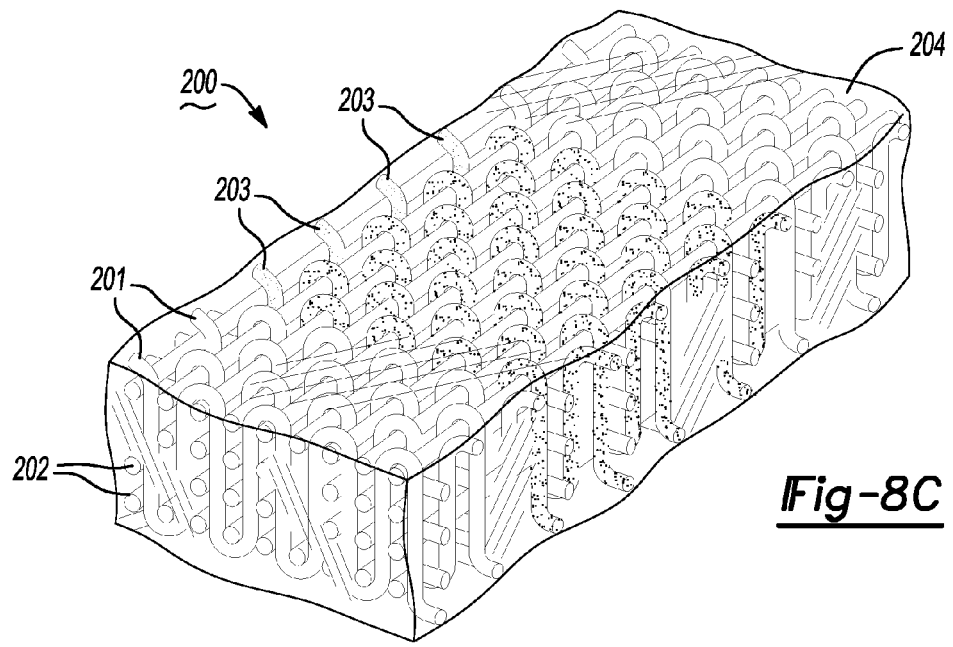
Figure 8D:
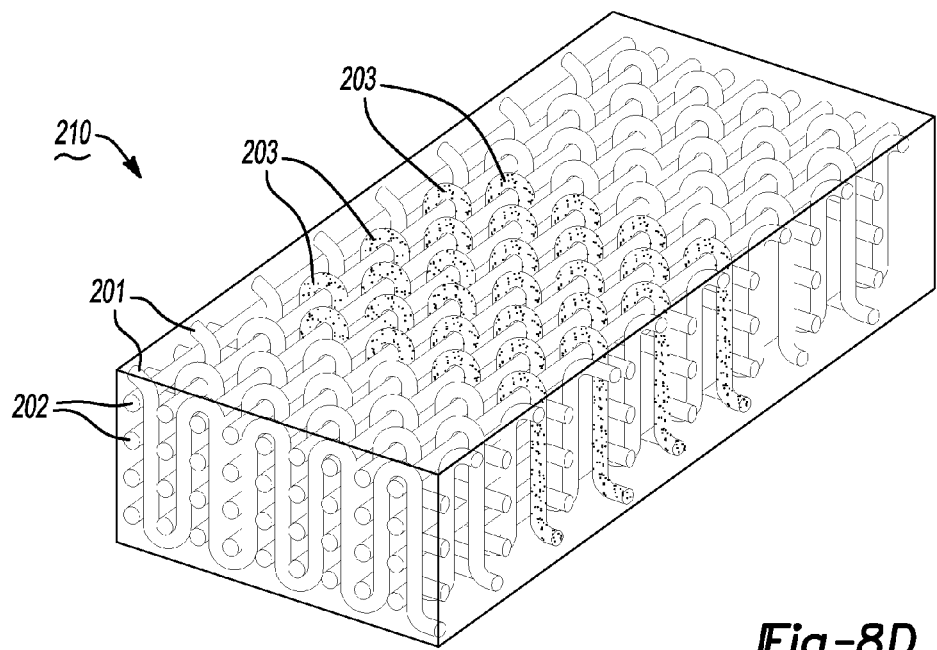
Figure 8E:
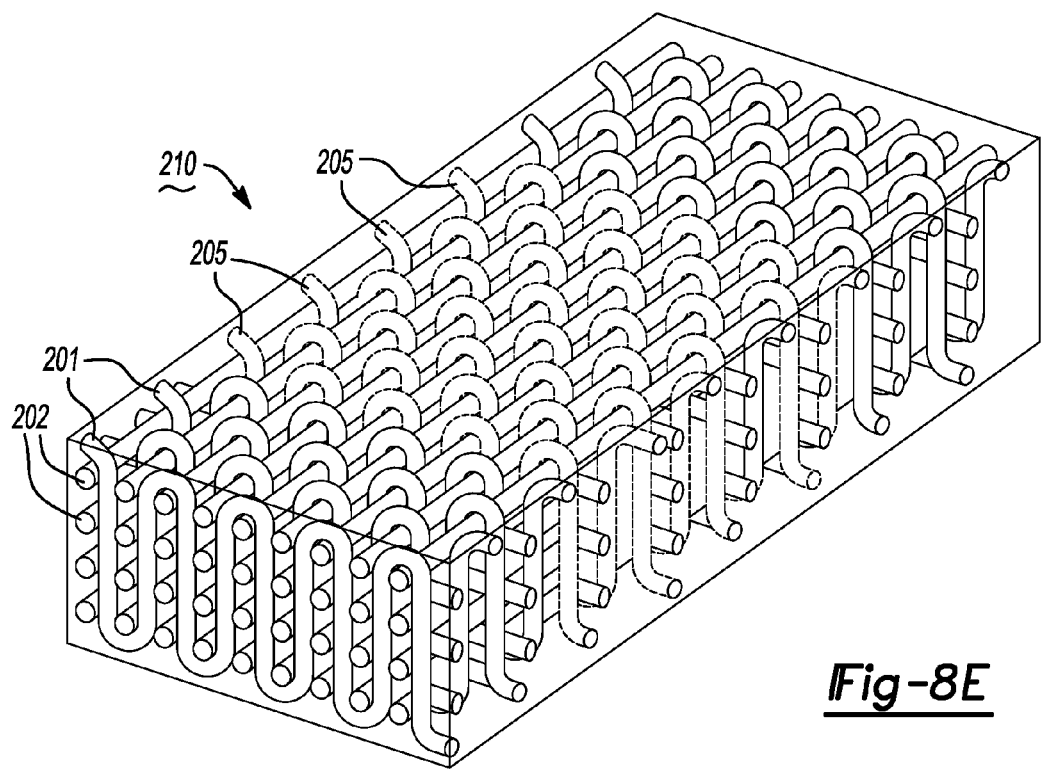

Following incorporation of the sacrificial fibers 203, a resin 204 is infused into the composite woven preform 200 that is then solidified (e.g., reacted or cured) under suitable conditions, as shown in FIGS. 8c and 8d, respectively, to form polymeric composite 210. After solidifying (e.g., reacting or curing), the polymeric composite 210 may be further treated (e.g., heated) to volatilize, melt, or degrade the sacrificial fibers 203 or the sacrificial fibers 203 may be dissolved to produce degradants. For example, the sacrificial fibers may be heated to a temperature (e.g., about 150° C. to about 200° C.) that substantially vaporizes or melts the sacrificial fibers but does not substantially degrade the reinforcing fibers and/or the cured resin. Any suitable solvent, such as, but not limited to acetone, may be applied to the sacrificial fibers to dissolve them, optionally with agitation, so long as the solvent does not substantially degrade or dissolve the reinforcing fibers and/or the cured resin. Alternatively, the sacrificial fibers may be etched using a suitable acid (e.g., hydrochloric acid, sulfuric acid, nitric acid, and the like). The degradants may be removed to form microchannels 205 in the polymeric composite 210, e.g., by applying a vacuum to the polymeric composite or introducing a gas to the polymeric composite to expel the degradants out of the polymeric composite. It also contemplated herein that the microchannels may be present in a non-polymeric composite housing, for example, in a metal housing or a ceramic housing.

In other variations, a composite precursor material may be injection molded or otherwise applied to the opposing exterior surface 4 of liner 2, which may be followed by curing to form the housing 8.

Additionally or alternatively, the polymeric composite (e.g., housing 8) may include a plurality of microspheres (not shown) for improved heat transfer. The microspheres may be ceramic or glass, and optionally, may be coated with a metal, ceramic and/or nanoparticles. Preferably, the coating has a high thermal conductivity, e.g., aluminum, copper, tin and the like. The microspheres may have a diameter of less than about 1,000 μm. Additionally or alternatively, the microspheres have a diameter of about 0.1 μm to about 1,000 μm, about 1 μm to about 500 μm or about 1 μm to about 200 μm.

Figure 9:
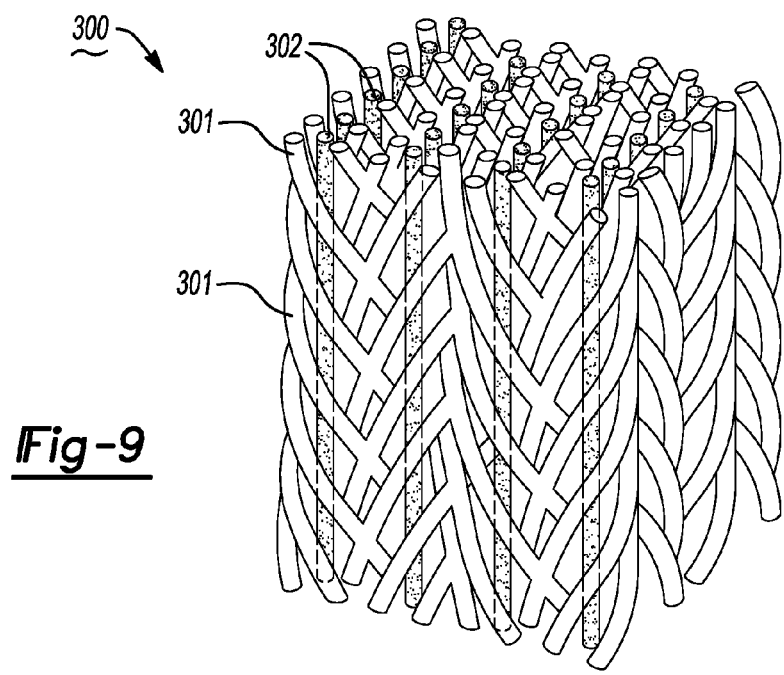
FIG. 9 shows a polymeric composite including reinforcing fibers and at least one wire.
Figure 10:
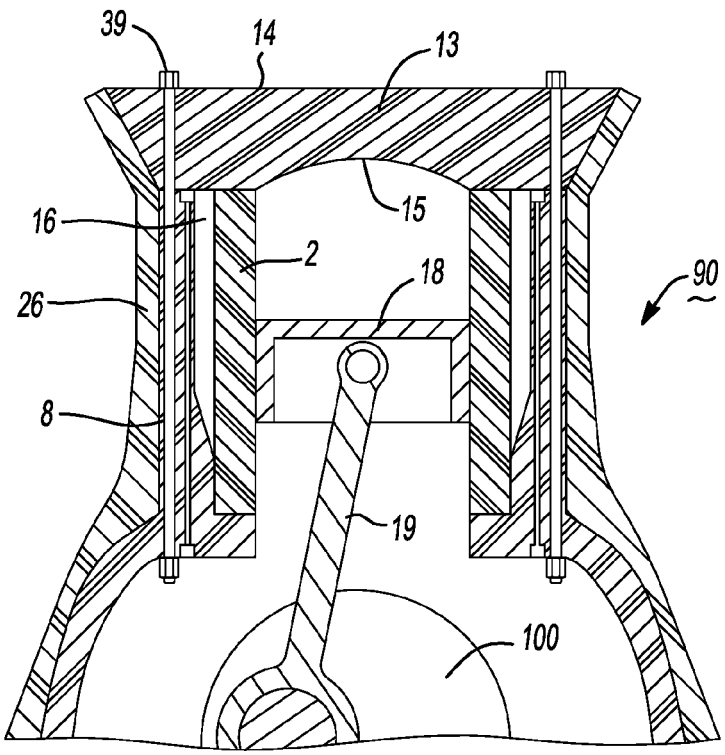
FIG. 10 shows an alternative cross-sectional view of a vehicle assembly according to certain aspects of the present disclosure.

Additionally or alternatively, the polymeric composite (e.g., housing 8) may include at least one wire for heating the engine assembly. For example, as shown in FIG. 9, one or more wires 302 may be incorporated or woven into reinforcing fibers 301 (e.g., carbon fibers) in the polymeric composite crankpin 300 (e.g., housing 8). The wires 302 may be comprise any material suitable for conducting electricity (e.g., copper, Nichrome, and the like). The wires 302 may be insulated from the reinforcing fibers 301. For example, the wires 302 may include a suitable insulative coating, such as a polymer coating and/or a braided glass fiber sheath. To heat the wires 302, electricity is provided by a battery or other suitable external source (not shown) and controlled by a control unit (not shown). Referring to FIG. 6, although now shown, a person of ordinary skill in the art appreciates that the wires 302 may be included in the housing 8 in addition to or instead of the plurality of microchannels 25.

In a particular embodiment, the polymeric composite housing comprises one or more of: (i) a plurality of microchannels as described herein; (ii) at least one wire as described herein; and (iii) a plurality of microspheres as described herein. Additionally or alternatively, the polymeric composite housing comprises two or more of (i), (ii) and (iii) (e.g., (i) and (ii), (i) and (iii), (ii) and (iii)). Additionally or alternatively, the polymeric composite housing comprises (i), (ii) and (iii).

Referring back to FIG. 6, the engine assembly 1 may further include a polymeric composite layer 26 disposed around at least a portion of the exterior surface 10 of the housing 8. The polymeric composite layer 26 may serve as a mechanical, chemical and/or thermal shield for the engine assembly. The polymeric composite layer 26 may comprise a suitable polymer as described herein (e.g., thermoset resin, thermoplastic resin, elastomer) and a plurality of suitable reinforcing fibers (e.g., carbon fibers, glass fibers, aramid fibers, polyethylene fibers, ceramic fibers, organic fibers, metallic fibers, and combinations thereof). In particular, the reinforcing fibers are glass fibers and/or carbon fibers. The reinforcing fibers may be discontinuous fibers. The polymeric composite layer 26 may be formed by injection molding. Additionally or alternatively, the polymeric composite layer 26 may extend around at least a portion of the cylinder head 13, as shown in FIG. 11. Further, as shown in FIG. 11 in an alternative vehicle assembly 90, the polymeric composite layer 26 may extend along substantially all of the exterior surface 10 of the housing 8. Additionally or alternatively, the polymeric composite layer 26 may extend around any peripheral systems of the vehicle assembly, e.g., water pump, air conditioner, turbocharger. Alternatively, it is contemplated herein, that instead of utilizing a polymeric composite layer 26, a metal layer or ceramic layer may be used in its place. Alternatively, it is contemplated herein, that instead of utilizing a polymeric composite layer 26, a metal layer or ceramic layer may be used in its place. Such a polymeric composite layer 26, metal layer or ceramic layer may seal the outside of the engine assembly and prevent leakage of fluid from between the various components in the engine assembly and may avoid the need for the use of gaskets for sealing the engine assembly.

In other variations, polymeric composites used herein for the housing 8, the polymeric composite pin 39, and/or the polymeric composite layer 26 may be made by any other suitable methods known in the art, e.g., pultrusion, reaction injection molding, injection molding, compression molding, prepreg molding (in autoclave or as compression molding), resin transfer molding, and vacuum assisted resin transfer molding. Further, fiber precursors may be made by any other suitable methods known in the art, e.g., braiding, weaving, stitching, knitting, prepregging, hand-layup and robotic or hand placement of tows.

Figure 11A:
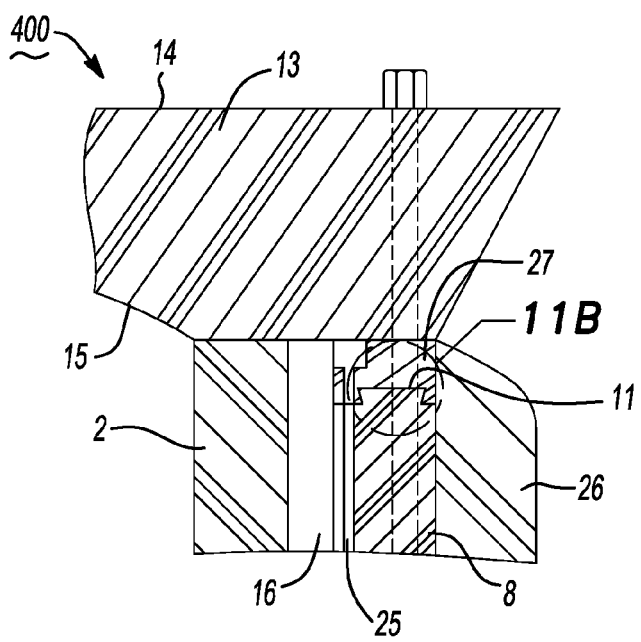
FIGS. 11a and 11b show an alternative cross-sectional view of a vehicle assembly according to certain aspects of the present disclosure.
Figure 11B:
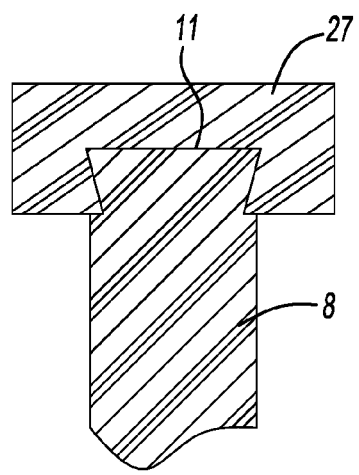

In various aspects, as shown in FIGS. 11a and 11b, an engine assembly 400 is contemplated, which includes a cap 27. The cap 27 may be adjacent to a third terminal surface 11 of the housing 8 and the sixth terminal surface 15 of the cylinder head 13. The cap 27 may be any suitable material, such as a metal, ceramic, or polymeric composite material. In particular, the cap 27 is metal (e.g., steel, iron, magnesium alloy, aluminum alloy), especially when the housing 8 is a polymeric composite because cap 27 may be more machinable than the polymeric composite. The cap 27 may serve as a mating surface between the cylinder head 13 and the housing 8. Preferably, the cap 27 and the liner 2 are the same material (e.g., metal) so that they may both be machined or formed together in preparation for a head gasket and/or the cylinder head 13. The cap 27 may be joined to the housing 8 with a suitable adhesive or directly molded with the housing 8. The cylinder head 13, the cap 27 and/or the housing 8 may be joined together via the methods described herein by a polymeric composite pin 39. Additionally or alternatively, a second cap (not shown) similar to the cap 27 may be adjacent to the eighth terminal surface 22 of the cylinder housing portion 8a and the ninth terminal surface 23 of the crank housing portion 8b.

Figure 12:
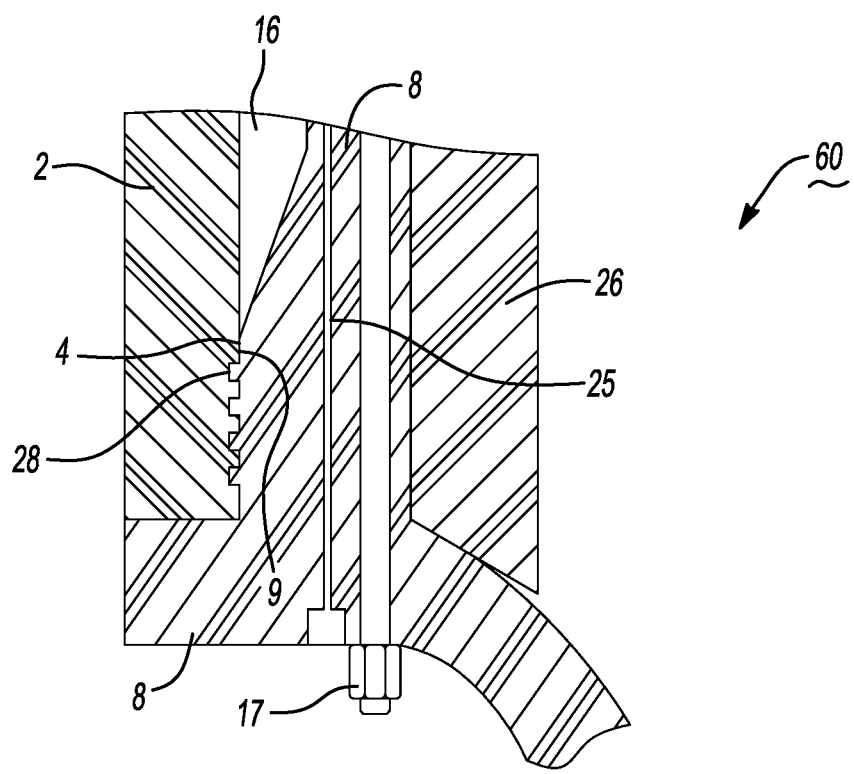
FIG. 12 shows an alternative cross-sectional view of a vehicle assembly according to certain aspects of the present disclosure.

In other variations, it is further contemplated that one or more of the vehicle assembly components described herein include one or more mechanical interlock features for coupling together the various vehicle components. For example, complementary protruding flanges, grooves, channels, locking wings of differing shapes could be used as mechanical interlock features. In particular, as shown in FIG. 12 in alternative engine assembly 60, at least a portion of the exterior surface 4 of the liner 2 may comprise one or more mechanical interlock features 28 for coupling with the housing 8 (e.g., interior surface 9), particularly where the housing 8 is a polymeric composite material. Additionally or alternatively, the cap 27 and or the third terminal surface 11 of the housing 8 may include one or more mechanical interlock (not shown) features for coupling the cap 27 with the housing 8. Additionally or alternatively, ceramic material may be present between various metal and polymeric composite components in the engine assembly for insulation purposes. It is understood herein that the various metal components described herein can be readily machined or cast.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A crankshaft assembly for a vehicle comprising:
a first crankpin disposed between a first pair of webs;

at least a first main bearing journal connected to the first pair of webs;

a sleeve disposed around the first crankpin;

a roller bearing disposed around the sleeve; and a metal counterweight disposed within, but separate from, at least one web of the first pair of webs;

wherein the first crankpin and the first pair of webs each consist essentially of a polymeric composite comprising a polymer and a plurality of reinforcing fibers.

2. The crankshaft assembly of claim 1, wherein the polymer is a thermoset resin or thermoplastic resin and the plurality of reinforcing fibers is selected from the group consisting of: carbon fibers, glass fibers, aramid fibers, polymeric fibers, metallic fibers and a combination thereof.

3. The crankshaft assembly of claim 1, wherein the sleeve comprises a metal material or a ceramic material.

4. The crankshaft assembly of claim 1, wherein the first pair of webs comprise at least one mechanical interlock feature for coupling with the first crankpin.

5. The crankshaft assembly of claim 1 further comprising a second crankpin disposed between a second pair of webs, wherein the first crankpin and the first pair of webs are connected to the second crankpin and second pair of webs by the first main bearing journal.

6. The crankshaft assembly of claim 5 further comprising a second main bearing journal connected to the second pair of webs.

7. The crankshaft assembly of claim 1 further comprising a connecting rod coupled to the first crankpin.

8. The crankshaft assembly of claim 1, wherein the first main bearing journal comprises the polymeric composite.

9. The crankshaft assembly of claim 1, wherein the first crankpin and the first pair of webs each consist of the polymeric composite.

10. A crankshaft assembly for a vehicle comprising:

a plurality of crankpins each disposed between a plurality of corresponding pairs of webs; a plurality of main bearing journals respectively disposed between adjacent pairs of the webs;

a front main bearing journal on a first terminal end of the crankshaft assembly and a rear main bearing journal on a second terminal end of the crankshaft assembly;

a sleeve disposed around at least one crankpin of the plurality of crankpins;

a roller bearing disposed around the sleeve; and a metal counterweight disposed within, but separate from, at least one web of the corresponding pair of webs;

wherein the crankpins and the pairs of webs each consist essentially of a polymeric composite comprising a polymer comprising a thermoset resin or a thermoplastic resin and a plurality of reinforcing fibers is selected from the group consisting of: carbon fibers, glass fibers, aramid fibers, polymeric fibers, metallic fibers and a combination thereof.

11. The crankshaft assembly of claim 10, wherein the plurality of main bearing journals comprise the polymeric composite.

12. The crankshaft assembly of claim 10, wherein the crankpins and the pairs of webs each consist of the polymeric composite.

* * * * *